UNITED STATES PATENT OFFICE.

LOUIS DENIS, OF LIEGE, BELGIUM.

REFRACTORY MATERIAL.

1,365,230.  Specification of Letters Patent.  Patented Jan. 11, 1921.

No Drawing.  Application filed April 4, 1919. Serial No. 287,515.

*To all whom it may concern:*

Be it known that I, LOUIS DENIS, manufacturer, a subject of the Kingdom of Belgium, and resident of Liege, in the Kingdom of Belgium, have invented certain new and useful Improvements in Refractory Material; and I do hereby declare the following to be a full, clear, and exact description of the invention, such as will enable others skilled in the art to which it appertains to make and use the same.

The present invention relates to improvements in the manufacture of refractory and porous materials.

The product made according to this invention is capable of withstanding very high temperatures such as 2000 degrees centigrade or even more, which temperatures are usual in surface combustion apparatus where combustible gases combine at the surface of a porous and refractory element. Usually however owing to the extremely high temperature produced, the hitherto known porous and refractory materials have been rapidly damaged, which fact has hindered the practical developments of surface combustion.

To obtain porosity, it has been suggested to mix with the refractory material previous to the burning process a granular material, which will, in the burning be consumed and thereby leave spaces within the mass. Owing to the relatively large volume of this granular material and to the very small quantities of gas which are evolved and again particularly owing to the fact that the release of the gaseous matter only takes place when the mass is partially burnt, the product thus obtained contains relatively large spaces separated by non-porous spaces.

According to this invention a refractory material can be obtained which is not only resistant to high temperatures, but also is thoroughly porous throughout which is particularly desirable for the purposes of surface combustion; further the elements of which the refractory material is made react chemically and physically in the most suitable manner to produce the desired gases.

These various results are obtained by the burning of a mixture of pure rich refractory earth, (*i. e.*, earth containing less than 80% of sand,) magnesia, a poor light soil (earth containing more than 80% of sand) and sawdust.

This mixture is heated to at least the temperature which it will be required later to withstand in use: the wood sawdust is consumed producing straight away the necessary gases which form the minute spaces and passages within the material so as to impart the necessary porosity to it.

It goes without saying that the proportions of the materials may be varied according to the particular use to which the final product is to be put, and particularly according to the temperature at which it has to operate.

By way of example the approximate proportions in which the various materials should be mixed to obtain a material capable of withstanding a temperature of say 1800° C. may be as follows.

30 parts of pure rich refractory earth,
30 parts of magnesia,
25 parts of poor or light earth,
5 parts of sawdust.

When the material is used for surface combustion it may be used either in the form of a porous diaphragm or in the form of pieces of suitable size.

What I claim is:

1. Porous, refractory material consisting of a mixture of pure, rich refractory earth, poor earth, magnesia and saw dust, heated to a temperature sufficiently high to consume the saw dust and thereby render the product porous.

2. Porous, refractory material consisting of a mixture of 30 parts of pure, rich refractory earth, 25 parts of poor earth, 30 parts of magnesia and 5 parts of saw dust heated to a temperature sufficiently high to consume the saw dust and thereby render the product porous.

In testimony whereof I affix my signature in presence of two witnesses.

LOUIS DENIS.

Witnesses:
LEONARD LEVER,
IRNOLDINE MELIN.